United States Patent
Oddera

(10) Patent No.: US 11,172,782 B2
(45) Date of Patent: Nov. 16, 2021

(54) METHOD FOR THE INSTANTANEOUS SELF-CALIBRATION OF THE DOSE FOR A COFFEE GRINDER-DOSER APPARATUS

(71) Applicant: FIORENZATO M.C. SRL, Vigonza (IT)

(72) Inventor: Manuel Oddera, Fonte (IT)

(*) Notice: Subject to any disclaimer, the term of this patent is extended or adjusted under 35 U.S.C. 154(b) by 371 days.

(21) Appl. No.: 16/281,588

(22) Filed: Feb. 21, 2019

(65) Prior Publication Data

US 2019/0254464 A1    Aug. 22, 2019

(30) Foreign Application Priority Data

Feb. 22, 2018   (IT) .................. 102018000002956

(51) Int. Cl.
| | |
|---|---|
| *A47J 31/40* | (2006.01) |
| *A47J 42/38* | (2006.01) |
| *A47J 42/40* | (2006.01) |
| *G01G 19/52* | (2006.01) |
| *A47J 31/42* | (2006.01) |
| *G01G 13/29* | (2006.01) |

(52) U.S. Cl.
CPC ............. *A47J 31/404* (2013.01); *A47J 31/40* (2013.01); *A47J 31/42* (2013.01); *A47J 42/38* (2013.01); *A47J 42/40* (2013.01); *G01G 13/29* (2013.01); *G01G 19/52* (2013.01)

(58) Field of Classification Search
None
See application file for complete search history.

(56) References Cited

U.S. PATENT DOCUMENTS

| | | |
|---|---|---|
| 5,522,556 A | 6/1996 | Knepler et al. |
| 6,783,089 B2 | 8/2004 | Lassota |
| (Continued) | | |

FOREIGN PATENT DOCUMENTS

| | | |
|---|---|---|
| EP | 3097831 A1 | 11/2016 |
| IT | UB20151304 A1 | 12/2016 |
| (Continued) | | |

OTHER PUBLICATIONS

Search Report and Written Opinion for priority IT Application No. 102018000002956.

*Primary Examiner* — John J Norton
(74) *Attorney, Agent, or Firm* — Egbert, McDaniel & Swartz, PLLC

(57) ABSTRACT

Method for the instantaneous self-calibration of the dose of coffee, for a grinder-doser apparatus with electronic control provided with a weighing means and with a granulometry adjusting means with a warning microswitch. The method provides: a first setting of the nominal dose with temporary grinding times; a second setting of the tolerance and reliability ranges of the dispensed doses, for the purpose of recalculation; the automatic control of the weight of each actually dispensed dose; the automatic recalculation of the grinding times according to an ordinary calculation logic, when one detects three consecutive out-of-tolerance doses all within the positive or negative reliability range, or according to a forced calculation logic when the microswitch detects a granulometry variation; automatic calibration of the apparatus according to the recalculated times.

10 Claims, 2 Drawing Sheets

(56) References Cited

U.S. PATENT DOCUMENTS

| | | | | |
|---|---|---|---|---|
| 2008/0202345 A1* | 8/2008 | Delonghi | ............. | A47J 31/525 |
| | | | | 99/280 |
| 2010/0095852 A1* | 4/2010 | Remo | ................. | A47J 31/3614 |
| | | | | 99/280 |
| 2010/0170971 A1* | 7/2010 | Doglioni Majer | ...... | A47J 42/38 |
| | | | | 241/30 |
| 2012/0196009 A1* | 8/2012 | Casado Gomez | .... | A47J 31/525 |
| | | | | 426/231 |
| 2016/0058244 A1* | 3/2016 | Laffi | ........................ | A47J 31/42 |
| | | | | 99/286 |
| 2016/0345778 A1* | 12/2016 | Oddera | ..................... | A47J 42/08 |
| 2018/0153349 A1* | 6/2018 | Abbiati | ................ | A47J 31/404 |
| 2019/0301924 A1* | 10/2019 | Muheim | .................. | A23F 5/08 |
| 2019/0365155 A1* | 12/2019 | Mazzer | .................. | A47J 42/16 |

FOREIGN PATENT DOCUMENTS

| | | |
|---|---|---|
| IT | UB20155477 A1 | 5/2017 |
| WO | 2013015801 A1 | 1/2013 |
| WO | 2017149183 A1 | 9/2017 |

\* cited by examiner

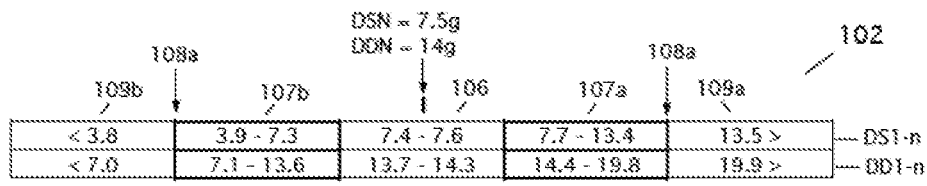
Fig. 2
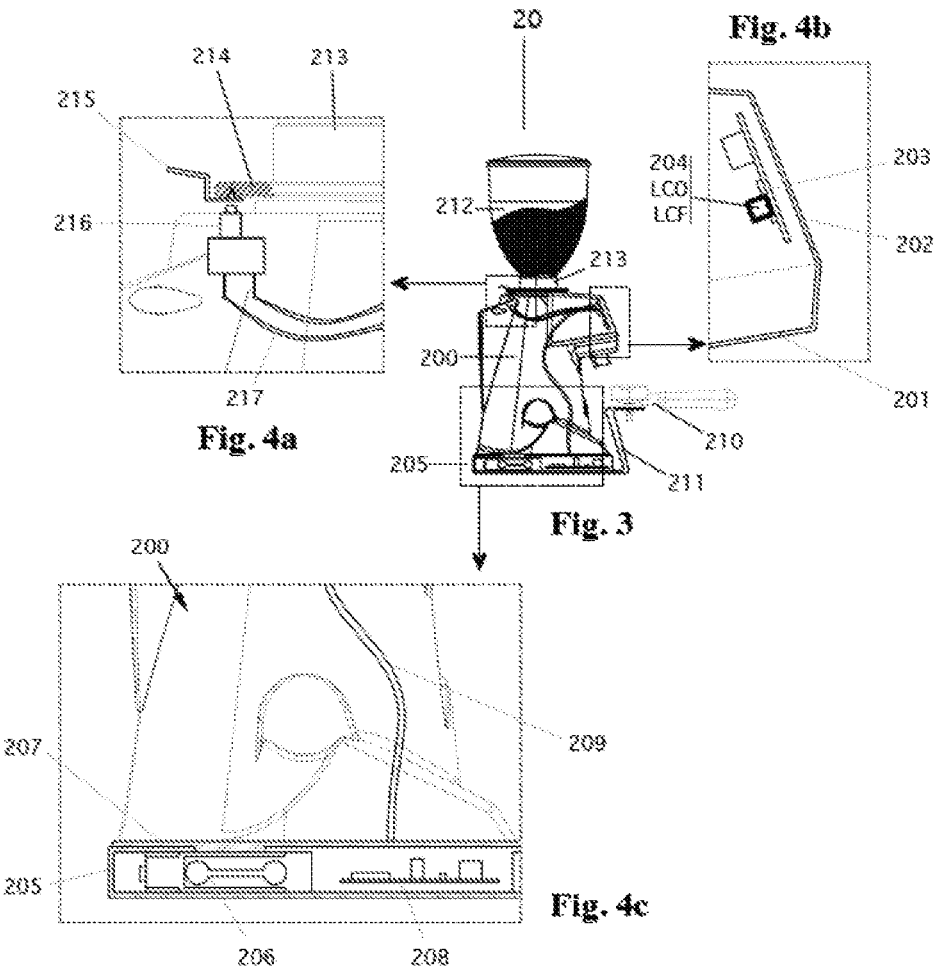

METHOD FOR THE INSTANTANEOUS SELF-CALIBRATION OF THE DOSE FOR A COFFEE GRINDER-DOSER APPARATUS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

Field of the Invention

The present invention relates to a method for the instantaneous self-calibration of the dose with automatic recalculation of the grinding times, for a grinder-doser apparatus of coffee in beans, which is provided with a weighing means and with a granulometry adjusting means; the present invention also relates to a grinder-doser apparatus suitable for said method.

Description of Related Art Including Information Disclosed Under 37 CFR 1.97 and 37 CFR 1.98

The invention finds application in the industrial sector of professional bar equipment for making espresso coffee; in particular, the proposed solution finds application in grinder-dosers of coffee in beans. Furthermore, the invention applies to any electronic apparatus for grinding organic products in predefined doses, which requires the periodic adjustment of the grinding times and of granulometry.

In general, professional machines for making espresso coffee, which are conventionally called coffee machines, are widely known, which use filter-holding bowls previously filled in the filter with the coffee powder obtained from the instantaneous grinding of coffee in beans, by means of a specific machine intended to grind and precisely dose it, which is also called grinder-doser apparatus. In particular, said filter-holding bowl must be filled with the exact quantity of coffee powder depending on the number of doses to be dispensed and on the quality provided; in general, in professional use, one or two doses are provided, in such a way as to prepare one or two cups of espresso coffee.

In a grinder-doser apparatus the coffee beans falling from a cone-shaped container arranged above the machine's main body are ground in such a way that the powder in micro granules is collected and correctly dispensed inside said bowl. In the professional sector grinder-dosers of the conventional or automatic—that is to say, electronic—type are used, wherein the former have a gate lever switch, which substantially allows the user to control how much and how to grind coffee, while the latter are provided with push-buttons and/or sensors that automatically control dispensing upon reaching a given threshold.

Said electronic grinder-dosers advantageously limit the operations by the operator who, sequentially, only has to position the bowl corresponding to the desired dose and then select said dose. Generally, the quantity of coffee relating to one or two doses is previously set by setting the parameters corresponding to the duration of grinding, that is to say, to the time of operation of the motor, which is necessary to dispense the desired weight of ground product.

The operators of the sector also know that in professional activity it is extremely important to precisely adjust the grinding time for the purpose of obtaining the exact quantity, in weight, of actually ground coffee, that is to say, the desired dose weight in grams; in fact, it is not constant but it is variable as a function of the granulometry and of the type of coffee used, of the wear of the machine and, in particular, of environmental conditions among which humidity and temperature. Basically, the duration of grinding is fixed, it being set with the initial setting of the apparatus, whereas the actually dispensed dose is each time slightly greater or smaller with respect to the desired weight, as a function of said parameters. In conventional practice, in order to compensate for such variations, professional operators periodically intervene on the setting of the apparatus, by manually modifying by progressive approximations the duration of said grinding in order to obtain the exact weight of ground and dispensed coffee; such a periodic adjusting operation is also referred to as dose calibration.

It was thus observed that, nowadays, the conventional and known systems for carrying out said calibration are little suitable for the professional sector in which espresso coffee is made at high frequencies and with high quality; in these cases it is thus necessary to grind the beans respecting the exact dose weight in grams provided by the operator's specific requirements, also considering said variables. Nowadays, in the grinder-dosers mainly used in the professional sector, in order to approach the desired dose, that is to say, in the calibration phase, the operator directly adjusts the set dose weight in grams values; as an alternative, some devices allow to intervene by modifying the grinding time associated with each dose.

In more detail as to the known and conventional solutions of control and adjustment of the actually dispensed dose, that is to say, for calibrating said dose, in particular, we recall various systems for weighing the ground product, being of the manual type as a periodic control sampling, or being of the semi-automatic type and simultaneous to grinding. Among the solutions that integrate, on the other hand, electronic weighing systems one should remember, for example, the documents U.S. Pat. No. 6,783,089 (Lassota), U.S. Pat. No. 5,522,556 (Knepler et al.) or also the model called Forté by the American company Baratza—www.baratza.com. Such solutions, in particular, propose weighing systems that are constructively and electronically integrated in the grinder-doser apparatus for the purpose of detecting, during dispensing, the weight of the product with the operating container, also interrupting grinding upon reaching the predetermined weight; in general, the weighing device is a scale with a horizontal plate on which the container is placed, with single strain gauges or with a central load cell, or is of the type with a side arm lever and with the load cell opposite with respect to the container.

In general, it was observed that the conventional solutions based on the taking and on the detection of the weight of a sample dispensing in order to calculate the corrections to be made to the setting of the apparatus are slow, uncomfortable and also imprecise, since many approximations are necessary before obtaining the desired result. For example, it was observed in practice that a common external scale involves several manual operations, also with a high risk of errors. It is also widely known that the conventional calibration solutions for grinder-dosers, which are intended for the preparation of espresso coffee, provide separate and additional operations that slow down the ordinary professional operations and distract the operator.

Moreover, in the solutions that weigh the product during dispensing, the known problem of the sensitivity of the weighing means has been found because, in order to dynamically and precisely measure the weight variations in the dispensing of minimum amounts of product, a very precise and sensitive device is required, for example an electronic load cell with strain gauges to a tenth of a gram; however, it is known that such a device is unsuitable if used during grinding, that is to say, with the strong vibrations that the internal motor of the grinder-doser apparatus transmits to the whole machine body, making the detected value of the single weighings little reliable and also causing decalibration of the whole system. Moreover, in the known solutions with direct weight detection, it was particularly observed that the weighing device is not used as a calibration tool, that is to say, there is no processing of the detected values for the purpose of calibrating the operating parameters, but, on the other hand, it is used as a limit switch, that is to say, basically acting as a switch that upon reaching the pre-set weight cuts off the power to the motor to consequently stop grinding; in fact, it is known that in these devices there is a remarkable amount of ground powder that is dispensed by inertia also after having reached the pre-set weight, thus making such solutions unreliable if applied to the purposes of the invention. Furthermore, in modern grinder-dosers there is the problem of fixing a filter-holding bowl for espresso coffee machines, which involves accidental impacts to the machine's body and tends to decalibrate any devices intended for weight detection, or anyway, it invalidates detection obtaining imprecise, that is to say, anomalous, values.

More generally speaking, it was observed that the known and conventional solutions are not suitable for professional use since they are little precise, little stable, slow and unsuitable for the modern grinder-dosers of the instantaneous type in which the dose is of a few grams, that is to say, for use in bars for making espresso coffee by means of filter-holding bowls; on the other hand, they are more suitable for the models in grocery stores, in which the weighing device is basically an external scale suitable for high dose weights in grams, like a not completely integrated accessory.

PRIOR ART

For the purpose of determining the prior art related to the proposed solution, a conventional check was made, searching public archives, which has led to find some prior art documents, among which:

D1) WO2013015801 (Rego et al.)
D2) U.S. Pat. No. 5,462,236 (Knepler)
D3) ITUB2015A001304 (Oddera)
D4) ITUB2015A005477 (Oddera)

D1 describes a device for measuring and displaying the exact quantity of ground coffee dispensed in a portafilter basket, in a coffee grinder-doser of the professional type, measuring the weight variation from the support of the basket; this device is of the electronic type and comprises a remote display for displaying the measured value and also comprises a particular portafilter basket equipped with buttons with digital user interface.

D2 proposes a grinder-doser intended to calculate the weight of the desired dose as a function of grinding time in such a way that the operator, by means of a particular electronic calibration circuit, which is also interfaced with the control logic unit of the grinder-doser, manually inserts the weight of the actually ground dose in order to correct its setting.

D3 describes an electronic coffee grinder-doses apparatus provided with an electronic weighing device with a load cell, directly connected to the control logic unit of the apparatus, enabling professional operators to often recalibrate the dose weight in grams on the basis of the actually ground and dispensed product amount, by means of a semi-automatic adjusting process to be carried out separately with respect to the ordinary activity, which involves: interruption of the ordinary activity, that is to say, of the normal dispensing service, manual sampling and weighing of numerous samples, calculation of the new grinding times according to a specific algorithm, automatic setting of said logic unit, restarting of the ordinary activity with the new grinding times.

D4 proposes a process for the continuous and automatic calibration of the dose for an electronic grinder-doser apparatus with a weighing device, wherein at the end of dispensing a load cell detects the weight of the actually dispensed dose to consequently recalculate the correct duration of grinding; said load cell has a horizontal load plane and is positioned between the base and the body of the apparatus, or it is integrated below the cone containing the coffee beans, in such a way as to progressively detect its decrease in weight. The proposed process is carried out continuously by cycles during ordinary operation and without interruptions, adapting the grinding times in such a way as to approach the desired dose weight in grams as much as possible; after a preliminary phase of setting of the desired dose weights in grams and of the temporary grinding times, the process provides continuously repeated automatic calibration cycles, each of which includes three sequential phases: a first phase of automatic control of dispensing with progressive weight detections, a second phase of automatic processing for determining the correct grinding times, a consequent third phase of automatic adjusting of the apparatus.

In short, it is thus reasonable to consider as known:
a grinder-doser apparatus of coffee in beans coupled with manual or electromechanical means for dosing the quantity of product ground and dispensed in the filter-holding bowl, in one or two doses;
an electromechanical grinder-doser apparatus with electronic control, or electronic grinder-doser, wherein the dose weight in grams is measured during dispensing, wherein the coffee is ground and directly weighed with its operating container, such as a filter-holding bowl, by means of a weighing device that is coupled with it and is connected to the control logic unit in order to automatically interrupt grinding upon reaching the preset weight, being thus of the "grind-by-weight" type;
an electronic grinder-doser apparatus of the grind-by-weight type, wherein the weighing device is placed outside the machine body like an island, or peninsula protruding from the base, or is positioned in an overhanging way in connection to the supporting and centering fork of the bowl, or, also, it is interposed between the motor compartment and the front compartment intended for dispensing in order to detect the weight of said compartment only.

a weighing device for an electronic girder-doser apparatus of the grind-by-weight type comprising a load cell connected in an overhanging way to the supporting fork of the bowl and also programmed in such a way as to detect a quantity of ground product that is smaller with respect to the desired value, considering that an amount of product is dispensed in any case after interruption;

an electronic grinder-doser apparatus of the grind-by-time type with pre-set values of the dose weight in grams, provided with a system for the control and manual or semi-automatic calibration of the actually dispensed dose, wherein it is provided to take a dose or a progressive series of dispensed doses like separately weighed samples, for a manual change of the setting, that is to say, by progressive approximations, or storing the detected values in a system that automatically makes the calculation and the adjustment;

an electronic grinder-doser apparatus of the grind-by-time type provided with a system for the control and continuous and automatic calibration of the actually dispensed dose, wherein at the end of dispensing a load cell placed below the machines body, or below the cone, detects the weight of the actually dispensed doses and consequently recalculates the correct duration of grinding according to a specific calculation logic.

Drawbacks

In general, the above-described solutions aim at overcoming the known difficulty experienced daily by professional operators in obtaining from the grinder-doser apparatus the precise quantity of actually ground and dispensed coffee, that is to say, the desired dose weight in grams; all the known and conventional solutions, however, have some disadvantages or unsolved problems.

In general, it was observed that the solutions intended for the control of the dispensed dose having a removable and heavy container for the ground product, that is to say, with a considerably greater tare with respect to the content, and also with an asymmetric and protruding shape to be handled and/or removed continuously, are thus unsuitable to guarantee high precision of detection in case of quantities with minimum variations, as for example in D1 wherein the portafilter basket is weighed separately on a small-sized separate device which is also provided with an electronic interface; therefore, in the professional sector, such a solution is expensive, fragile, uncomfortable in use and inaccurate in results.

Among the semi-automatic solutions, D2 provides the addition of a complex electronic calibration circuit that interacts with said logic unit acting as a user interface, which must carry out the weighing and insert the data manually according to a specific process that, in fact, is not convenient in the frequent use of the professional sector. In D3, on the other hand, the operator must interrupt the ordinary dispensing to perform the planned semi-automatic calibration cycles, manually taking multiple ground coffee samples in order to detect the precise weight thereof and consequently carry out the calibration; such a solution, although effective in adjustment, is however long to be executed and requires considerable attention by the operator to perform the control weighings according to the modes provided by the process. Moreover, such a solution with separate sampling features the evident difficulty of re-using the already dispensed product fix the purpose of said calibration, since the used coffee is of high quality, expensive and quickly perishable.

It was then observed that in the most evolved systems for the control and the continuous and automatic calibration of the dispensed dose, as for example in D4, there is greater reliability with respect to said known solutions, particularly where the detections are performed with the motor off; in D4, however, some variables of use of the apparatus are not considered, and the method of recalculation of grinding times and the specific embodiment configuration of the apparatus are improvable. It was observed, for example, that sometimes it can be disadvantageous to make the recalculation of the duration of grinding by continuous cycles considering the averages of all the detections, progressively grouped; it was experimentally observed, in fact, that for the purposes of the present invention it is essentially useless to consider in said recalculation the weight values that are inexact but are considered as acceptable, or even the anomalous values that are often due to accidental impacts, malpractice by the operator or even to temporary malfunctions of the apparatus, as sometimes happens with the mains supply. Particularly in the known solutions, among which D4, the problem of the frequent granulometry variations made by the operator, for example by activating an adjusting locknut, is not solved, wherein such a variation is ignored in the recalculation of the grinding duration even if it considerably modifies the dispensed quantity of ground coffee powder; in fact, it is known, in that case, that before said automatic calibration multiple dispensings with wrong dose weights in grams take place. Furthermore, for the purpose of greater effectiveness and rapidity in said calibration of the apparatus and for greater dispensing reliability and stability, it was observed that all the known solutions would be improvable in the method for processing the detected values, for example by considering for the purpose of recalculation only some out-of-tolerance values and discarding the useless and/or anomalous ones.

Therefore, from everything stated above, although being desirable, in the professional sector to this day there is no improved method for the automatic calibration of the single and double dose, with high precision, with an automatic and instantaneous calibration of the apparatus, which operates continuously and autonomously during ordinary operation to instantaneously re-calibrate the grinding duration parameters as a function of the actually dispensed doses as well as a function of each granulometry adjustment, to approach the desired dose weight in grams in any operating condition as much as possible, with no waste of coffee or of labour and with no dispensing of insufficient quality. Furthermore, a grinder-doser apparatus that allows to perform said method, keeping in consideration said granulometry variations as well, is not known and is widely desirable.

All things considered, there is the need for the companies of the sector to find some innovative solutions able to overcome at least the above-mentioned problems.

BRIEF SUMMARY OF THE INVENTION

These and other aims are achieved by the present invention according to the characteristics as in the appended claims, solving the above-mentioned problems by means of method (10) for the instantaneous self-calibration of the dose of coffee, for a grinder-doser apparatus (20) with electronic control (203, 204, LCF, LCO) provided with a weighing means (205, 206) and with a granulometry adjusting means (214, 215) with a warning microswitch (216). The method provides: a first setting (101) of the nominal dose with temporary grinding times (TS, TD); a second setting of the tolerance (106) and reliability (107a, 107b) ranges of the dispensed doses, for the purpose of recalculation; the automatic control (103) of the weight of each actually dispensed dose; the automatic recalculation (104) of the grinding times according to an ordinary calculation logic (204, LCO), when one detects three consecutive out-of-tolerance doses all within the positive or negative reliability range, or according to a forced calculation logic (204, LCF) when the microswitch (216) detects a granulometry variation; automatic calibration (105, TS, TD) of the apparatus according to the recalculated times (TS, TD).

Aims

In this way, by the considerable creative contribution the effect of which constitutes an immediate and important technical progress, various remarkable advantages are achieved.

A first aim was to operate continuously according to always correct grinding times, also after any granulometry variation. More generally speaking, the invention aims at providing an effective self-calibration method and a related machine for grinding and dosing coffee in beans in such a way as to obtain a continuous and automatic calibration of the single dose and of the double dose, also keeping in consideration the main operating variables such as the selected granulometry and the type of grinding elements— either flat or conical—mounted on the apparatus, thus allowing in an easy and cost-effective way to continuously adapt the grinding times related to the single dose and to the double dose as a function of the actually dispensed dose weights in grams, approaching the exact weight desired for each dose as much as possible. Therefore, professional operators can automatically keep the weight constant, thus keeping the final quality of the espresso served to the customer constant as well, limiting any possible changes caused by said variables as well as by the state of preservation of the beans, by the state of maintenance of the machine and by environmental conditions.

A second aim was to eliminate the conventional periodic interruptions of the service that are necessary to carry out said calibration in a separate way with respect to ordinary operation as instead occurs in the conventional and known systems. Moreover, the costs associated with the time and/or sampling required by said operations are eliminated.

A third aim was to eliminate any interventions on the apparatus by the operator, except for the initial settings, considerably reducing the occasions for distraction, fatigue or human error in daily professional practice.

A fourth aim of the invention was to use structurally and electronically integrated load cells, in such a way as to provide the apparatus with constant dispensing stability and reliability of the detections, in all the conditions that may change the exact planned quantity of ground product; the proposed calibration system is advantageously applicable in the modern electronic grinder-dosers that are combined with bar equipment for the extraction of espresso coffee, therefore with the conventional filter-holding bowls for coffee machines.

Therefore, the proposed self-calibration method provides the important advantage of considerably reducing the dispensed doses with an out-of-tolerance dose weight in grams, in correspondence of a granulometry variation as well, improving quality, as well as of considerably facilitating and speeding up daily professional practice. Moreover, it is possible to reduce the waste of coffee unnecessarily dispensed; more generally speaking, non-negligible cost savings are obtained, also due to the reduction of the time wasted for said controls and calibrations.

To conclude, all these advantages have the important merit of obtaining a method for automatic and instantaneous calibration suitable for professional use, and also of providing a grinder-doser apparatus intended to implement it; said method is precise and reliable, being based on the weight detected after each dose actually dispensed, with the motor off, and on the main operating variables among which the frequent granulometry variation. Therefore, as a whole, there is provided an improved and constructively simplified calibration system, with good technological contents as well; furthermore, the invention, is cost-effective and is producible in large quantities by means of the modern industrial processes.

These and other advantages will appear from the following detailed description of a preferred embodiment with the aid of the drawings enclosed.

BRIEF DESCRIPTION OF THE SEVERAL VIEWS OF THE DRAWINGS

FIG. 2 schematically shows, for the single and the double dose, an exemplary setting of the apparatus according to the proposed method, wherein the values delimiting the tolerance range of the detected dose with respect to the initially set nominal value (DSN, DDN), and the out-of-tolerance values that are acceptable for the purpose of the recalculation of the grinding times, in positive and in negative with respect to said tolerance, are indicated centrally, while externally there are the anomalous values not considered for said recalculation;

FIG. 3 is a simplified side view of the grinder-doser apparatus that allows to carry out the method proposed by the invention, being represented with the components mounted, with the filter-holding bowl hooked and with some parts in section to facilitate the understanding of the inside;

FIGS. 4a, 4b and 4c are detail sections relating to the hatched boxes, as in the previous figure, representing in particular: the warning microswitch for granulometry variations (4a), the board acting as a control logic unit with management programs that also execute the proposed self-calibration method (4b), the weighing device with the load cell independent of the fixing of the filter-holding bowl (4c).

DETAILED DESCRIPTION OF THE INVENTION

Figure 1:
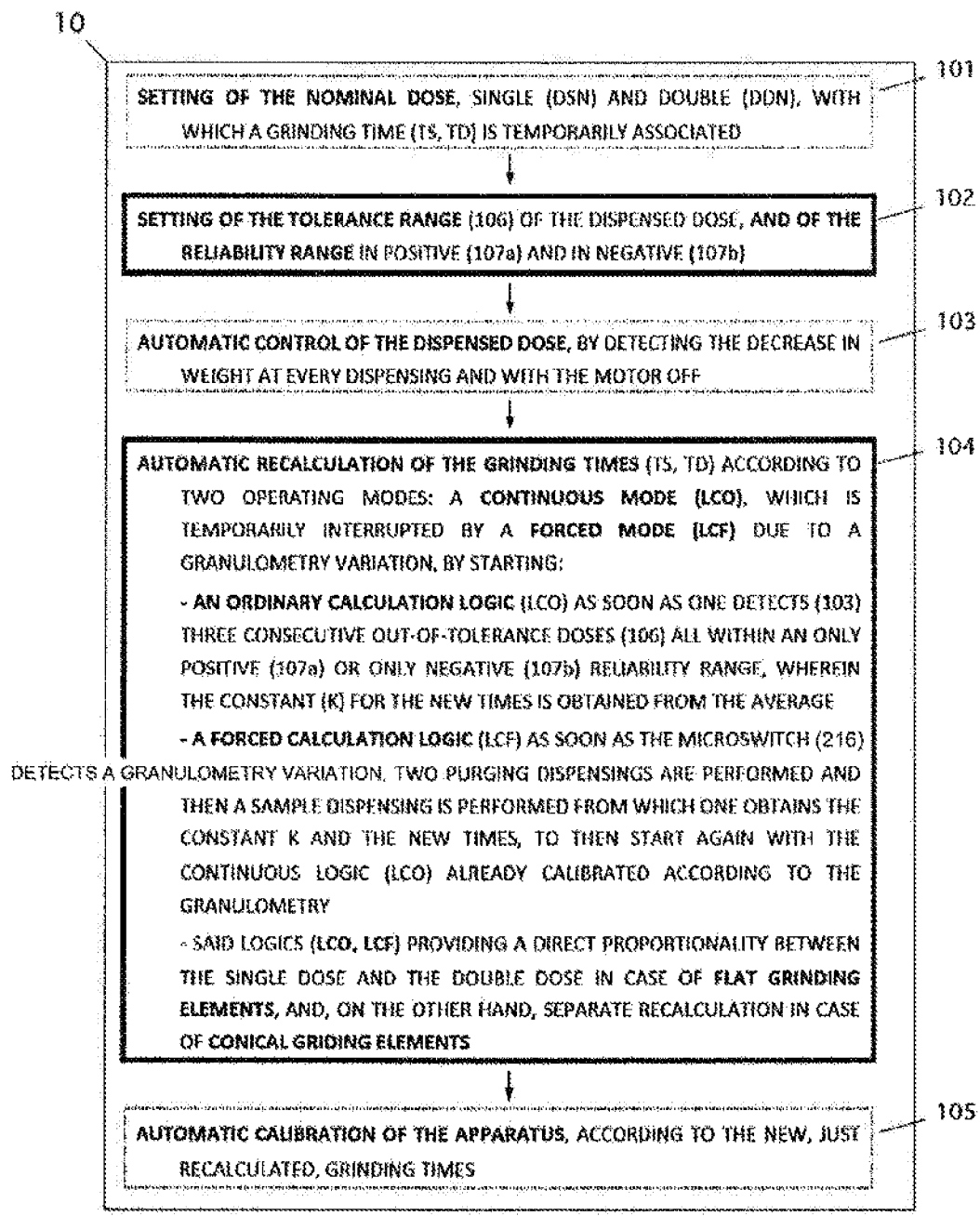
FIG. 1 schematically shows the method for the instantaneous self-calibration of the dose according to the invention; the boxes relating to the first setting, to the automatic weight control and to the final calibration are conventionally indicated with a dotted line, since they are essentially known, while the boxes relating to the second setting and to automatic recalculation, which are innovative and advantageous, are indicated with a thicker continuous line.

With reference to the figures (FIGS. 1-4) as well, the present invention relates to an innovative method (10) for the automatic and instantaneous calibration of the dose of dispensed coffee, single or double, for a grinder-doser apparatus (20) with electronic control (203, 204) provided with an electronic weighing means (205, 206) and a warning microswitch (216) combined with the granulometry adjusting means (214, 215), in such a way that in the recalculation of the grinding times such adjustments are properly and immediately taken into account. By the method (10) proposed by the present invention and the apparatus (20) that allows to implement it, it is possible to solve the problems as in the known solutions and to achieve the planned aims, considerably facilitating daily professional practice and improving the quality of dispensing.

At the start of said method (10), a first setting (101) is necessary, which relates to the desired dose weight in grams, that is to say, the nominal weight value corresponding to the single dose (DSN) and to the double dose (DDN), wherein with said set weight one temporarily associates the corresponding grinding time (TS, TD), that is to say, the duration of activation of the grinding elements by the motor; in particular, for the purpose of the automatic recalculation (104) of said times, the proposed solution (10) is conceived in such a way that the operator also carries out a second setting (102), which relates to a tolerance range (106) for the weight values detected by the load cell (103, 205, 206) with respect to said set nominal value (101), while simultaneously setting (102) a reliability range (107*a*, 107*b*) of the divergent, that is to say, out-of-tolerance, values. In more detail, a maximum limit (108*a*) and a minimum limit (108*b*) are defined for the reliability of the detected values for the purpose of the recalculation (104) of the times, such limits corresponding to the extreme values considered real and relating to the specific configuration of use, because it is believed that out of these values there may be an operating or functional anomaly. In this way one defines an intermediate range between tolerance and anomaly, which is conventionally defined as reliability range, and which is partly positive and partly negative there being a positive reliability (107*a*) above the accepted tolerance (106) but lower than or equal to the maximum reliable value (108*a*), while the negative reliability (107*b*) is below the accepted tolerance (106) but is higher than or equal to the minimum reliable value (108*b*) (FIG. 2).

For the purpose of the proposed method (10), to ensure a high degree of precision and repeatability of the desired dose weight in grams (DSN, DDN) the anomalies and the occasional divergences, which for example are caused by the operator's malpractice or by an occasional impact during the detection by the cell, or even due to problems of the mains supply, are disregarded in said recalculation (104); in particular, the apparatus (20) recalculates (104) said grinding times at the occurrence of at least two consecutive detections of single dose or double dose, having out-of-tolerance and reliable values, that is to say, all in said positive reliability range (107*a*) or all in said negative reliability range (107*b*). In the present description, by out-of-tolerance and reliable values one conventionally means the consecutive detections that are out of tolerance but are anyway within a reliability range and with the same sign; preferably, in ordinary use, it is provided that the automatic calibration of the apparatus is activated at the third consecutive out-of-tolerance and reliable detection, only positive or only negative, as is exemplified for the sake of clarity hereinafter.

Said reliability range (107*a*, 107*b*) is thus defined by an upper limit (108*a*) and a lower limit (108*b*) beyond which there are the anomalous, that is to say, unrealistic, values (109*a*, 109*b*), which are not taken into consideration for the purpose of said automatic recalculation (104), since they are caused by an operating or functional anomaly of the grinder-doser apparatus (20). For safety reasons, when an anomalous dose, above (109*a*) said upper reliability limit (108*a*) or below (109*b*) said lower reliability limit (108*b*), is dispensed, there is a temporary suspension of the detections considered in the recalculation (104) of the weighings, that is to say, there is the intervention of a slowdown algorithm in which said recalculation is substantially postponed by some dispensings, preferably three or four or five dispensings, in such a way as to check whether the anomaly is repeated, that is to say, whether it is continuous and ascertained, and thus the necessary measures for solving it must be taken, or it is simply an occasional, that is to say, sporadic and negligible, anomalous dose. If said anomalous detections persist, a warning is displayed to the operator; otherwise, that is to say, with an occasional anomalous dose, the operator will not notice anything.

Therefore, in more detail as to the method (10) proposed by the invention, after every dispensing and with the motor off the apparatus (20, 203, 205) automatically controls (103) the decrease in weight on the cell (206), obtaining the actual weight of each dispensed dose (DS1-*n*, DD1-*n*). Particularly, for the purpose of the invention, the recalculation (104) of the new grinding times (TS, TD) occurs according to two different operating modes that each time are automatically selected as a function of ordinary use or of a possible detection of granulometry variation, as described hereinafter: a first continuous mode that is always operative in ordinary use except for when a movement, that is to say, a variation, of the granulometry adjusting locknut (214, 215) is detected, in which case a second forced mode is temporarily activated, which is intended to immediately re-calibrate the apparatus as a function of the new selected granulometry, to then start again with the continuous mode already precisely calibrated, avoiding the dispensing of undesired doses, that is to say, dispensed with obsolete granulometry.

In more detail (FIG. 1), in said first mode one operates according to ordinary use and in the absence of variations, as in a continuous and normal basic mode, wherein said recalculation (104) occurs only when the actually detected weights are out of tolerance and reliable, of the same sign, that is to say, only positive or only negative with respect to the nominal value, and not anomalous (FIG. 2); in this case an ordinary calculation logic (LCO) is automatically adopted. The second operating mode, on the other hand, is forcedly activated every time there is a granulometry variation, in that case adopting a forced calculation logic (LCF) that at every granulometry adjustment starts to empty the grinding chamber with purging dispensings and then performs a sample dispensing that is weighed in any case, independently of whether it is in or out of said tolerance range (106), in such a way that its weight value is used to calibrate the duration of grinding as a function of the new granulometry. Therefore, the invention provides an apparatus (20), which is advantageously intended to detect said variation by means of an innovative warning microswitch (216), which is combined with the adjusting locknut (214), and which is mechanically connected to the pin-spring device (215) for locking the locknut, and is also connected by cable (217) to the control logic unit (203, 204) (FIGS. 3, 4*a*); after said forced calibration of the times (104, LCF), with immediate automatic calibration of the apparatus (105), that is to say, setting of the parameters, said continuous operating mode, which operates with said ordinary calculation logic (104, LCO), is automatically restored.

At the basis of the innovative method (10) for the self-calibration of the grinder-doser apparatus (20) lie a double of calculation logic (104, LCO, LCF) and a new initial setting where the operator, after the desired dose weight in grams (101, DSN, DDN), also sets the limit values defining said tolerance range and said reliability range, for the purpose of recalculation (102, 106, 107*a*, 107*b*, LCO). In more detail, by way of example only, in the initial setting of the apparatus (10) one sets the nominal dose weight in grams (101) with the Nominal Single Dose (DSN) amounting to 7.5 grams and the Nominal Double Dose (DDN) amounting to 14 grams, and one also sets said tolerance and reliability ranges (102), wherein the respective limit values, in grams, are progressively represented below:

single dose:

<(3.8)|3.9–7.3|7.4–7.6|7.7–13.4|(13.5)> double dose:

<(7.0)|7.1–13.6|13.7–14.3|14.4–19.8|(19.9)> wherein, in order to facilitate understanding, the tolerance range (106) is here centrally indicated in bold, with the accepted values between 7.4 g and 7.6 g for the single dose and between 13.7 g and 14.3 g for the double dose, and wherein the external values that presumably correspond to an operating or functional anomaly (108a, 108b) are indicated in brackets, while the intermediate values corresponding to said reliability range (107a, 107b), in positive and in negative with respect to the accepted values, are underlined, said values being out of tolerance and being considered in said recalculation (104) for automatic calibration, being respectively included between 7.7 and 13.4 and between 3.9 and 7.3 for the single dose and included between 14.4 and 19.8 and between 7.1 and 13.6 for the double dose. In the preferred embodiment of the invention (10), such out-of-tolerance and reliable values are taken into consideration by the logic unit (203, 204) of the apparatus (20) whenever they occur three consecutive times in the same intermediate range, only positive (107a) or only negative (107b), for the single, dose or the double dose (FIGS. 1 and 2).

Assuming such a setting (FIG. 2), for example, the method (10) according to the invention, which is implemented according to the typical operating modes that can be found in the professional use of the apparatus (20), is operatively described hereinafter; in the continuous mode, in the forced mode, with flat grinding elements or with conical grinding elements. In more detail, said recalculation of the doses (104) is made by means of two different algorithms when the apparatus (20) has flat grinding elements mounted thereon, providing a constant of dispensing (K) that is equal both for the single dose and for the double dose, there being in the duration of grinding a directly proportional ratio of 1 to 2. Therefore, two more algorithms are provided when the apparatus has conical grinding elements mounted thereon, wherein said constant of dispensing (K) is different between the single dose (KS) and the double dose (KD) and wherein the respective grinding times are not directly proportional to each other.

Preferentially, in said continuous mode that corresponds to ordinary use in the absence of granulometry variations, the recalculation (104, LCO) occurs when three out-of-tolerance and reliable doses, with the same sign (107a, 107b), are consecutively detected (103): in this case an algorithm recalculates the new constant of dispensing (K) putting it in relation to said set nominal dose weight in grams (101, DSN, DDN) of the doses to be dispensed. In said forced mode, on the other hand, it is possible to forcedly recalculate (104, LCF) said doses in case of variation of the grinding granulometry, therefore after a rotary movement of the grinding adjusting locknut (214). The recalculation of the doses, that is to say, of the related grinding times (TS, TD), can be advantageously sped up and/or forced through a microswitch (216), which automatically informs the software (204) of the logic unit (203) that a granulometry variation has occurred, and consequently there is a variation of the dispensed doses. In the preferred embodiment (FIGS. 3, 4a, 4b), the grinding variation occurs by means of a rotation of the locknut (214) for adjusting grinding, wherein the latter is locked by a locking system of the pin-spring type (215) (FIG. 3a). Said microswitch (216), which is also called warning switch, is connected to said pin-spring device (215) for locking said locknut (214) in such a way as to be automatically activated every time said granulometry variation is performed by means of a rotation of the adjusting locknut (214), by starting said recalculation (104, LCO). As a consequence, both for the single dose and for the double dose, in the grinder-doser apparatus (20, 203, 204) there is the automatic setting of the respective grinding duration parameters (TD, TS).

Therefore, in short, the method (10) proposed by the present invention provides (FIG. 1):

a first setting (101) of the desired dose weight in grams or fixed nominal dose, single (DSN) and double (DDN), with which a grinding time (TS, TD) is temporarily associated;

an innovative second setting (102) of the tolerance range (106), with respect to said nominal values, and of the limits (108a, 108b) of said reliability range (107a, 107b) beyond which there is a possible anomaly (108a, 108b) (FIG. 2);

the automatic control (103) of the decrease in weight after every dispensing and with the motor off, obtaining the actual weight of each dispensed dose;

the automatic recalculation (104) of the grinding times (TS, TD), which advantageously occurs:

in said continuous use according to an ordinary calculation logic (LCO), when there are three consecutive out-of-tolerance dispensings within the reliability range (102), all in negative or all in positive with respect to the nominal value (DSN, DDN), considering the average of the detected weights and the constant (K) of actual dispensing to obtain the new times (TS, TD), or it occurs, in the forced use, according to a forced calculation logic (LCF) when the microswitch (216) (FIG. 4a) detects a granulometry variation, performing two purging dispensings and one sample dispensing for determining the constant K of actual dispensing with the new granulometry to obtain the new times (TS, TD) from which one can start again with the ordinary logic (LCO); and wherein, if the apparatus has flat grinding elements mounted thereon, said recalculation (LCO, LCF) occurs with a direct proportionality between the single dose and the double dose, whereas, if conical grinding elements are mounted thereon, it is performed every time separately for both;

the automatic calibration (105) of the apparatus according to said just recalculated grinding times (TS, TD).

With reference to said method (10) and to said set limit values (101, 102), by way of example only, as stated above (FIG. 2), some practical examples of recalculation (104, LCO, LCF) according to the main operating variables that can be found in daily professional practice are set forth below.

EXAMPLE 1: CONTINUOUS MODE (LCO) WITH FLAT GRINDING ELEMENTS; DIVERGENT VALUES OF THE SAME SIGN WITH RESPECT TO THE NOMINAL VALUE

With non-activation of the microswitch (216), in the continuous operating mode, the recalculation algorithm intervenes only when three consecutive doses, single or double, are dispensed, with out-of-tolerance, reliable values, and of the same sign, that is to say, all within said positive (107*a*) or negative (107*b*) reliability range, with respect to the set nominal value.

First setting (101):

DSN, that is to say, nominal single dose: dose weight in grams amounting to 7.5 g, with dispensing time (TS) of 2 sec;

DDN, that is to say, nominal double dose: dose weight in grams amounting to 14 g with dispensing time (TD) of 3.7 sec.

Detection (103) of three actually dispensed single doses, consecutive, out-of-tolerance and reliable (102):

$$DS1=4.1 \text{ g}; DS2=4.2 \text{ g}; DS3=4.1 \text{ g}.$$

In this case there are 3 consecutive dispensings in negative (107*b*), thus the algorithm intervenes to self-calibrate the apparatus; it adjusts the dose dispensing time by putting in relation the constant of dispensing (K) of the actually dispensed doses to the desired nominal dose weight in grams. Calculation of the average of the detected weights or actual doses:

$$DSM=4.1+4.2+4.1=12.4/3=4.1 \text{ g}$$

Calculation of the constant K of actual dispensing:

$$K=TS/DSM=2/4.1=0.48$$

Recalculation of the dose, that is to say, of the grinding time associated with the nominal value of the weight in grams of a single dose:

$$TS \text{ recalculated}=K*DS=0.48*7.5=3.6 \text{ sec}$$

EXAMPLE 2: CONTINUOUS MODE (LCO) WITH FLAT GRINDING ELEMENTS; DIVERGENT VALUES OF THE SAME SIGN WITH RESPECT TO THE NOMINAL VALUE BUT WITH A DOUBLE DIVERGENT DOSE INTERPOSED $$DS1=4.1 \text{ g}; DS2=7.8 \text{ g}; DS3=4.5 \text{ g}.$$

Three out-of-tolerance doses and within the reliability range are detected, which, however, are not all within the same positive (107*a*) or negative range (107*b*) with respect to the set nominal value: in this case the recalculation algorithm (LCO) does not intervene.

EXAMPLE 3: CONTINUOUS MODE (LCO) WITH FLAT GRINDING ELEMENTS; A VALUE INTERPOSED BY A DOSE OF DIFFERENT TYPE $$DS1=4.1 \text{ g}; DD1=7.6 \text{ g}; DS2=4.2 \text{ g}; DS3=4.1 \text{ g}.$$

In this case, although a double dose is interposed, the software equally detects the three doses (DS1, DS2, DS3), out-of-tolerance, reliable and all in negative (107*b*), which are consecutive, considering the single dispensings only, thus the recalculation is activated. It is important to point out that the double dose, too, has considerably decreased with respect to the set nominal value, because, if the single dose varies, as a consequence the double dose will vary in the same way as the single dose; in this case, there being a direct ratio of 1 to 2 between the single dose and the double dose, the algorithm automatically recalculates time both for the single dose (TS) and for the double dose (TD). So, similarly to what has been set forth in Example 1:

$$DSM=4.1+4.2+4.1=12.4/3=4.1$$

$$K=TS/DSM=2/4.1=0.48$$

$$TS \text{ recalculated}=K*DSN=0.48*7.5=3.6 \text{ sec}$$

$$TD \text{ recalculated}=K*DDN=0.48*14=6.3 \text{ sec}$$

EXAMPLE 4: FORCED MODE (LCF) WITH FLAT GRINDING ELEMENTS; MICROSWITCH ACTIVATION, PURGING AND SAMPLE DISPENSING

In the grinding changing phase, thus of activation of the microswitch (216) by rotating the grinding adjusting locknut (214), the next two dispensed doses, single or double, are not taken into consideration by the software (203, 204, LCF) since they basically correspond to purging doses for eliminating the coffee that has remained inside the grinding chamber, having been ground with an undesired, i.e. obsolete, granulometry; then, a single or double dose is dispensed with updated granulometry, according to the just performed adjustment, which acts as a sample dose for recalculating the time of both doses (TS, TD). In this case it should be remembered that, with flat grinding elements mounted on the apparatus, said 1 to 2 ratio applies, which puts the single dose in direct relation to the double dose. Previously set values:

$$DSN=7.5 \text{ g with } TS=2 \text{ sec}$$

$$DDN=14 \text{ g with } TD=3.7 \text{ sec}$$

By reducing the grinding (214, 215) one activates the microswitch (216) that warns the software (203, 204) about the variation occurred, thus the emptying of the grinding chamber, which generally corresponds to a couple of dispensings, for example one single and one double, which are also called purging dispensings and which are not taken into consideration for the purpose of recalculation, is automatically started (LCF); in correspondence of such dispensings, in fact, the apparatus does not perform any detection (103). Then there is the dispensing of a sample double dose (DDC), for the purpose of recalculation, which, once put in relation to the grinding time, is used by the algorithm to calculate the new constant K of dispensing.

Weight of sample double dose DDC=7.6 g $$K=TD/DDC=3.7/7.6=0.48$$

Recalculation of time for the single dose: $TS \text{ recalculated}=K*DSN=0.48*7.5=3.6 \text{ sec}$ Recalculation of time for the double dose: $TD \text{ recalculated}=K*DDN=0.48*14=6.7 \text{ sec}$

EXAMPLE 5: CONTINUOUS MODE (LCO) WITH CONICAL GRINDING ELEMENTS; SINGLE DOSES

Unlike what has been set forth in the previous examples with flat grinding elements, in the apparatuses having conical grinding elements mounted thereon there is no direct proportion between the grinding times for the single dose and those for the double dose, there thus being a constant of dispensing (Ks) for the single doses that is different from the constant of dispensing (Kd) for the double doses. The recalculation (LCO) intervenes only when three reliable and consecutive divergent values of the single or double dose are detected, without interpositions, what has been set forth in said Example 3 with flat grinding elements not being valid.

$DS1=4.1$ g; $DS2=42$ g; $DS3=4.1$ g.

In this case there are 3 consecutive dispensings in negative; the algorithm operates in the way set forth in said Example 1 both for the single dose and for the double dose. The constant (Ks) of actual dispensing for the single doses is thus of 0.48, as in the constant (K) of said Example 1, and wherein the recalculated grinding time, associated with the nominal value of the weight in grams of a single dose, is thus: $TRS=Ks*DS=0.48*7.5=3.6$ sec, as in Example 1.

EXAMPLE 6: CONTINUOUS MODE (LCO) WITH CONICAL GRINDING ELEMENTS, DOUBLE DOSES $DD1=9.1$ g; $DD2=9.3$ g; $DD3=9.2$ g.

In this case there are 3 consecutive divergent and reliable dispensings in negative (107*b*): by a process similar to what has been set forth above, the detected values are automatically averaged:

Average $DDM=9.1+9.3+9.2=27.6/3=9.2$ g

Calculation of the constant (Kd) for the double dose:

$Kd=TD/DDM=3.7/9.1=0.40$

Recalculation of time for the double dose:

$TD$ recalculated$=Kd*DDN=0.4*14=5.6$ sec

In fact, it should be noted that said constant of dispensing (Ks) for the single dose is of 0.48 while the constant Kd for the double dose is of 0.40.

EXAMPLE 7: FORCED MODE (LCF) WITH CONICAL GRINDING ELEMENTS, SINGLE DOSES, MICROSWITCH ACTIVATION, PURGING AND SAMPLE DISPENSING

In the grinding changing phase, said rotation of the adjusting locknut (214) activates said microswitch (216) that thus starts said two following purging dispensings, wherein the dose is single or double, which are not taken into consideration by the software (203, 204) since they are used to eliminate the coffee with obsolete granulometry that is still inside the grinding chamber. In particular, the following sample dose is differentiated between the single dose and the double dose, since the grinding time is not directly proportional, as exposed above; therefore, in this case, one considers a constant of dispensing (Ks) of the single dose that is different from a constant of dispensing (kd) of the double dose, being respectively intended to recalculate said single dose and said double dose.

Sample single dose (DSC), weight of actually dispensed coffee for the purpose of the recalculation of the time associated with the nominal single dose:

$DSC=4.1$ g

Constant of dispensing (Ks) for the single dose:

$Ks=TS/DSC=2/4.1=0.48$

Recalculation of time for the single dose:

$TS$ recalculated$=Ks*DSN=0.48*7.5=3.6$ sec

EXAMPLE 8: FORCED MODE WITH CONICAL GRINDING ELEMENTS, DOUBLE DOSES, MICROSWITCH ACTIVATION, PURGING AND SAMPLE DISPENSING

Sample double dose (DDC), actually dispensed for the purpose of recalculation of the time associated with the nominal double dose:

$DC=9.1$ g

Calculation of the constant of dispensing (Kd) for the double dose:

$Kd=TS/DDC=3.7/9.1=0.40$

Recalculation of time for the double dose:

$TD$ recalculated$=Kd*DDC=0.4*14=5.6$ sec

From a point of view of the realization of the apparatus (20) (FIGS. 3, 4*c*), in principle a high-precision weighing device (205) is used, of the electronic scale type with a horizontal detection plane with a load cell (206) of the type conventionally called single point load cell, which is intended to precisely detect a weight between 0 and 20 grams measuring variations up to one hundredth of a gram; said load cell (206) makes immediately available to the control logic unit (203, 204, LCO, LCF), at the end of dispensing, and namely with the motor off in order to ensure maximum stability and detection reliability, at least the exact weighing value in hundredths of a gram. Said cell (20) is powered by a power transformer (208) that, like the cell, is directly controlled by said logic unit (203). As a non-exhaustive example, a cell of the type marketed by the German company Siemens under the name of Siwarex R Load Cells—Sp Series—in the customized configuration for weights lower than 0.1 Kg and detections up to one hundredth of a gram is suitable for the invention.

The present invention describes, for the sake of description and construction simplicity, a weighing device (205) comprising one cell (206) only; however, it is also possible to use multiple cells if this allows to enhance detection quality or in the case of a particular realization and/or application configuration of the invention (10, 20); as a non-exhaustive example, sometimes a couple of cells (206) equal to each other and powered by the same transformer (208) (FIGS. 3, 4*c*) may be suitable.

Finally, it was observed in practice that said self-calibration method (10) and grinder-doser apparatus (20) provided by the invention considerably simplify the work of a professional operator, with less physical and mental fatigue, having at one's disposal a constantly calibrated apparatus in such a way as to maximize the quality of the service provided and to instantaneously and precisely obtain the desired exact weight in grams of the dose of ground and dispensed coffee, considering the many variables involved, among which, in particular, the adjustment of the dose weight in grams.

REFERENCE (10) method for the automatic and instantaneous calibration of the dispensed dose of ground coffee, or self-calibration, according to the invention;
(101) setting of the desired dose weight in grams or nominal dose;
(102) setting of the tolerance and reliability ranges;
(103) automatic control of the actually dispensed dose;
(104) automatic recalculation of the grinding times;
(105) automatic calibration of the apparatus, or setting of times;
(106) tolerance range of the detected values;
(107*a*, 107*b*) reliability range of the detected values, for recalculation, in positive (107*a*) or in negative (107*b*) with respect to the tolerance range;
(108*a*, 108*b*) upper and lower limits of the reliability range;

(109a, 109b) range of the anomalous, i.e. unrealistic, values, caused by an operating or functional anomaly of the apparatus;
(20) electronic grinder-doser apparatus of coffee in beans, with an electronic weighing device and a granulometry adjusting means;
(200) main body of the grinder-doser;
(201) instrument panel;
(202) touch screen, as a control and setting panel;
(203) control logic unit of the motherboard type;
(204) management programs of the software and algorithms type, for managing in an integrated way the apparatus and the method according to the invention, comprising ordinary and forced control logics, for the automatic recalculation of times;
(205) weighing device integrated like a base below the main body, independent of the filter-holding bowl;
(206) load cell, of the single point type with a horizontal load plane;
(207) load plane resting on the cell, corresponding to the bottom;
(208) cell/charging power transformer;
(209) power and data transfer cable;
(210) filter-holding bowl;
(211) support for the filter-holding bowl, independent of the cell, i.e. fixed below the weighing device;
(212) cone-shaped container for the roasted coffee beans;
(213) coupling of the cone-shaped container, in correspondence of the grinding elements;
(214) locknut for adjusting grinding, i.e. granulometry;
(215) lever with pin-spring;
(216) microswitch warning about movement of the locknut, i.e. about granulometry variation;
(217) cables of connection of the microswitch to the control logic unit;
(DS1-$n$, DD1-$n$) weight in grams of the dispensed dose, i.e. actual weight in grams of each progressively dispensed single dose (DS1-$n$) or double dose (DD1-$n$);
(DSM, DDM) average weight of the out-of-tolerance detections considered each time for the purpose of recalculation, for single and double doses;
(DSN, DDN) nominal dose or desired dose weight in grams, corresponding to the weight in grams that one wishes to obtain for the single and double dose, set at start-up being a fixed reference;
(K) constant of actual dispensing, from which the new grinding times are obtained, wherein in case of conical grinding elements said constant in the single dose (KS) is different from the constant in the double dose (KD), whereas it is the same in case of flat grinding elements;
(LCF) forced calculation logic, for a forced operating mode;
(LCO) ordinary calculation logic, for a continuous operating mode;
(TS, TD) grinding time for the single and the double dose, automatically recalculated and re-set each time according to the proposed method.

The invention claimed is:

1. A method for automatic and instantaneous calibration of a dose of ground coffee in order to set a desired dose weight and to automatically control an actual weight of the dose and to automatically recalculate a duration of grinding, the method using an electromechanical grinder doser that is managed by a control logic unit with a management program, the grinder-doser apparatus having an electronic weighing device integrated below a main body, the main body having at least one load cell connected to the control logic unit so as to detect a weight decrease of the dose at a dispensing of the dose, the electromechanical grinder doser having a filter-holding bowl, the detection of the weight decrease being independent of the filter holding bowl, the method comprising:
setting a desired weight of the dose by an operator;
temporarily associating grinding times to the desired weight of the dose;
automatically controlling the decrease of the weight of the dose after each dispensing with a motor of the electromechanical grinder doser off;
obtaining an exact weight of each dose actually dispensed;
automatically recalculating the grinding times in relation to detected values of the exact weight of each dose according to the management program;
automatically calibrating the grinding duration parameters according to the recalculated grinding times;
automatically resetting the grinding duration parameters in the control logic unit;
defining a tolerance range and a reliability range of the detected values by the operator with respect to the desired weight of the dose, the tolerance range comprising accepted values of doses considered compliant, the reliability range comprising values of non-compliant doses, the reliability range being defined by an upper limit and a lower limit;
dividing the reliability range into a positive reliability range above the tolerance range and a negative reliability range below the tolerance range, wherein the automatic recalculating is carried out according to a first continuous mode and a second forced mode, the first continuous mode following an ordinary calculation logic, the second forced mode following a forced calculation logic, wherein the ordinary calculation logic and the forced calculation logic are in the management program, the first continuous mode being executed during use of the electromechanical grinder doser, the use being interrupted by the second forced mode upon an occurrence of a granulometry variation of the dose of ground coffee;
immediately calibrating the electromechanical grinder doser as a function of the granulometry variation; and
starting the electromechanical grinder doser with the first continuous mode updated, wherein the automatic recalculating in the first continuous mode only uses the detected values that are out of tolerance in the reliability range each time only in the positive reliability range or only in the negative reliability range, wherein in the second forced mode a grinding chamber of the electromechanical grinder doser is emptied with non-detected purging dispensings and then at least one sample dispensing is performed, the at least one sample dispensing having a weight used in the step of automatically recalculating.

2. The method of claim 1, wherein the ordinary calculation logic of the first continuous mode is started as soon as three doses are consecutively out of tolerance and all are within the positively reliability range or negative reliability range, an average of the three doses being a constant of actual dispensing, the step of automatic calibrating using the constant of actual dispensing to obtain the new grinding time.

3. The method of claim 1, wherein the grinding times are recalculated each time proportionally to the dose.

4. The method of claim 3, the dose being a single dose and a double dose, the electromechanical grinder doser having flat grinding elements mounted therein, wherein the step of automatically calibrating is carried out simultaneously with the single dose and the double dose.

5. The method of claim 3, the dose being a single dose and a double dose, the electromechanical grinder doser having conical grinding elements mounted therein, the step of automatically calibrating being recalculated and calibrated separately for the singe dose and the double dose.

6. The method of claim 1, wherein the forced calculation logic is started as soon as a granulometry variation is detected, the forced calculation logic performing two purging dispensings and then the sample dispensing so as to produce a constant of actual dispensing, the constant of actual dispensing producing new grinding times.

7. The method of claim 1, the dose comprising a single dose and a double dose, the electromechanical grinder doser having flat grinding elements, the new grinding times being recalculated with a direct proportionality between the single dose and the double dose, the step of automatically calibrating being carried out simultaneously for the single dose and the double dose.

8. The method of claim 1, the dose comprising a single dose and a double dose, the electromechanical grinder doser having conical grinding elements mounted thereto, the step of automatically calibrating recalculating and calibrating separately for the single dose and the double dose, the sample dispensing being performed twice in sequence, once for the single dose and once for the double dose.

9. The method of claim 1, wherein when an anomaly of the dose is above the upper limit or below the lower limit of reliability, a temporary suspension of the detections in the step of recalculating occurs, the method further comprising:
checking whether the anomaly continues; and
alarming the operator if the anomaly continues.

10. A grinder-doser apparatus for coffee beans, the grinder-doser apparatus continuously and automatically controlling an actual weight of a dispensed dose of coffee with an automatic and instantaneous calibration of the dose of ground coffee, the grinder-doser apparatus being electromechanical, the grinder-doser apparatus comprising:
a control logic unit having a management program;
at least one load cell with an electronic scale, said at least one load cell having a horizontal weighing plane, said at least one load cell being connected to said control logic unit;
a main body having abase, the electronic scale integrated in the base, the control logic unit adapted to automatically detect a decrease of weight of the dose at each dispensing, said main body having a motor therein;
a granulometry adjuster mounted in said main body, wherein the automatic calibration occurs by setting a desired weight of the dose, the electronic scale adapted to weigh the dispensed dose at each dispensing with the motor off, the automatic recalculation of a duration of grinding occurring at each dispensing, another automatic recalculation being carried out by the management program of said control logic unit;
a microswitch connected to said control logic unit, said nmicroswitch providing a warning of a variation of granulometry of the dispensed dose;
a pin-spring device mechanically connected to said microswitch;
an adjusting locknut connected by a cable to said control logic unit, said pin-spring device locking the adjusting locknut when said microswitch provides the warning, wherein the management program includes calculation logics for automatically recalculating according to a first continuous mode and a second forced mode, the first continuous mode following an ordinary calculation logic, the second forced mode following a forced calculation logic, the second forced mode temporarily interrupting the first continuous mode each time said microswitch detects the variation, the control logic unit setting a tolerance range and a reliability range for the detected values, the tolerance range being accepted values of dispensed doses that are compliant, the reliability range being values of non-compliant doses;
a grinding chamber positioned on said main body, said grinding chamber being automatically emptied when variations are detected by said microswitch;
a filter-holding bowl having a supporting fork releasable from said main body, said filter-holding bowl being fixed to the base of the main body under said load cell, said load cell detecting a decrease in weight of the dispensed dose independently of said filter-holding bowl; and
a plurality of grinding elements operatively connected to the motor, the plurality of grinding elements being either flat grinding elements or conical grinding elements.

* * * * *